(12) United States Patent
Liaw et al.

(10) Patent No.: US 6,437,542 B1
(45) Date of Patent: Aug. 20, 2002

(54) PRESSURE-BASED BATTERY CHARGING

(76) Inventors: Bor Yann Liaw, 1508 Hoanina St., Honolulu, HI (US) 96821; Xiao-Guang Yang, 830 University Ave., Apt #7, Honolulu, HI (US) 96822

( * ) Notice: Subject to any disclaimer, the term of this patent is extended or adjusted under 35 U.S.C. 154(b) by 0 days.

(21) Appl. No.: 09/976,779

(22) Filed: Oct. 13, 2001

Related U.S. Application Data

(60) Provisional application No. 60/240,686, filed on Oct. 13, 2000.

(51) Int. Cl.$^7$ .............................................. H01M 10/46
(52) U.S. Cl. ....................................................... 320/147
(58) Field of Search .................................. 320/127, 128, 320/135, 137, 147, DIG. 17; 324/426, 435, 437

(56) References Cited

U.S. PATENT DOCUMENTS

| | | | | |
|---|---|---|---|---|
| 4,057,478 A | * | 11/1977 | Bruckenstein et al. | |
| 4,366,431 A | * | 12/1982 | Santini | |
| 4,499,424 A | * | 2/1985 | Rowlette | |
| 5,642,032 A | * | 6/1997 | Kokuga | |

* cited by examiner

*Primary Examiner*—Edward H. Tso

(57) ABSTRACT

Battery charge control protocols and methodologies to use pressure-based controls and algorithms to properly terminate battery charging processes.

18 Claims, 4 Drawing Sheets

(A)

(B)

(A)

(B)

PRESSURE-BASED BATTERY CHARGING

CROSS-REFERENCE TO RELATED APPLICATIONS

This application claims the benefit of the filing of U.S. Provisional Patent Application Serial No. 60/240,686, entitled "Battery Charging Using Pressure-based Control", filed on Oct. 13, 2000, and the specification thereof is incorporated herein by reference.

BACKGROUND OF THE INVENTION

1. Field of the Invention (Technical Field)

The present invention relates to battery charging control methods and apparatuses.

2. Background Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

In the last decade, the development of electric and hybrid vehicles and the rapid expansion of portable computers, electronic devices and telecommunication tools in the U.S. and other regions of the world have sparked an enormous interest in developing advanced battery systems and sprawling a strong demand in high power applications. These developments called for rapid prototyping of the batteries and devices and better charging and safety control and cycle life. Charging technology becomes an indispensable part of the battery technology development, particularly for safety, reliability, and cycle life considerations.

Electric and hybrid vehicles (EHVs) promise much reduced emissions, high fuel economy, and lowered maintenance costs. However, the high power and sporadic usage of the battery pack and the effects from such usage on battery performance remain a great concern for automakers and have a direct impact on consumers' acceptance. As for pure electric, an additional demand for reliable, high-power, rapid charging infrastructure is embracing. Similar situations are emerging in the computer, mobile telecommunication, and network infrastructure, where demands for reliable power, steady performance and rapid charging capability are challenges need solutions.

Among all battery charging techniques used to date the most prevailing charge controls for the Ni—Cd and Ni—MH batteries, for example, are often based on temperature acceleration ($\Delta T/\Delta t$) and peak voltage detection. Recently, we proposed a new charge technique for the Ni—MH traction batteries by detecting the internal pressure built-up [Yang, X. G. and B. Y. Liaw, "Fast Charging Nickel-Metal Hydride Traction Batteries," J. Power Sources, 101, 158 (2001)]. The pressure-control-based charge technique is more sensitive and reliable than the conventional temperature or/and voltage detection approaches because of the direct monitoring of the gas evolution and recombination. The disadvantage of the temperature detection comes from the inherent large heat capacity of the battery that makes the detectable temperature acceleration insensitive until the battery is substantially overcharged with severe gassing. Another problem is the ambient temperature change that could easily skewed the temperature detection, making the charging control vulnerable. Repeated overcharging is hazardous to battery cycle life. On the other hand, the peak voltage determination for full charge is hindered by aging and inhomogeneous electrode reaction. Both deficiencies could cause local overcharge, dry-out and shortened battery life.

SUMMARY OF THE INVENTION (DISCLOSURE OF THE INVENTION)

The present invention comprises methodologies that can be used in battery charging control. The invention comprises methods of utilizing a pressure probe, measuring and monitoring the pressure change inside a battery, interpretation of the pressure profile and its change, using the interpretation of such changes as the primary protocols in conjunction with other parameters monitored and determined in the process in the termination of the battery charging process.

The invention also comprises battery charge control protocols that use internal battery gas pressure and its change in a charging process. The pressure-based protocols can be as simple as a pressure lid or as complicated as a dependence on its change with various combinations of time, operating temperature range, the ambient pressure in the operating environment, voltage range and/or its change, current level and/or its change, charge inputs and/or outputs, and other possible pertinent parameters (such as age, state of charge, or state of health, etc.) that are also monitored or determined in the charging process or control algorithm.

The invention further comprises battery charging control protocols that can be used in battery chemistries that have side reactions that generate gas species, therefore create pressure in the battery in such a way that the gas pressure change can be interpreted to predict the degree of the reaction, the reaction rate, the extent of the impacts on the battery performance, and the possible effects that can degrade the battery performance including life. The pressure-based control protocols can prevent gas generating side reactions to degrade battery performance or its life.

The invention additionally comprises battery charging control protocols that can be used in batteries that use aqueous electrolytes and organic electrolytes that involve either gas reactions or gas generating side reactions. Without proper control of the pressure changes in the battery, the battery will not perform efficiently or effectively. The pressure control provides the most direct monitoring of the chemistry involved in the battery, thus is capable of minimizing side reactions that generate gas species and cause adverse effects to the battery performance.

The invention still further comprises the pressure controlled charge protocols that can be used in nickel-based chemistries and batteries effectively with high charge efficiency at high power or high rate charging and can deliver reliable capacity consistently. The charging rate can be as high as more than 3C rate without signs of degradation from high rate charging.

The invention yet further comprises battery charging control protocols that use pressure-based control strategy to protect the battery from degradation caused by gas generating reactions. The gas generation could occur depending on operating temperature, working voltage range, current level, charge inputs, impurities and contaminants, and other circumstantial conditions that can change the reaction chemistry to produce gas species.

The invention also comprises battery charging protocols that can take the advantages of battery design, configuration, and modification of the chemistry to withstand high pressure excursions and exhibit better mechanical limits to sustain pressure changes without compromising or degrading battery performance. The pressure limits of the operation could be decided by the mechanical integrity of the containment and its tolerance to the pressure change. The higher the pressure limits, the better the charge return and the higher the availability of the capacity.

The invention additionally comprises battery charging protocols that use pressure control to minimize thermal excursion or temperature change to improve charge efficiency, operating safety and reliability of power delivery.

The invention further comprises the use of pressure probing devices to monitor the gas pressure change in a battery, the method of providing secured seal of the battery containment and access to the headspace for pressure measurement and monitoring, and the feedback of the pressure signals to the charge control mechanism so proper termination of the charging process can be executed with a;proper algorithm. The invention comprises the intelligence of using and interpreting the pressure profiles and their behaviors as a major factor in determining the termination conditions for the battery charging process.

The invention yet further comprises the design, deployment, installation, implementation of gas sensing devices and pressure probes in the control of battery charging process. The design, deployment, installation and implementation of the charge control strategies and protocols include but not limit to hardware and physical devices and software development, algorithm implementation, and signals and commands communication.

The invention of using the pressure-controlled protocols is more effective in controlling charging processes in nickel-based aqueous battery chemistries, such as Ni—Cd and Ni—MH. For any battery chemistry, the higher the pressure excursion, the better the sensitivity in the control. The higher the charge rate, or the higher the charge power level, the more effective the protocols can serve than the other conventional techniques based on temperature or voltage measurements.

A primary object of the present invention is to develop a reliable protocol to properly terminate the battery charging process, enhance charging efficiency and protect or even improve battery life.

A primary advantage of the present invention is that pressure-based battery charging control and algorithms can achieve the above objectives and goals better than the conventional voltage and/or temperature-based techniques. The control is also much simpler than the conventional techniques that track voltage, temperature, and/or amp-hour charge inputs, therefore potentially more cost effective.

Other objects, advantages and novel features, and further scope of applicability of the present invention will be set forth in part in the detailed description to follow.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention.

Figure 1:
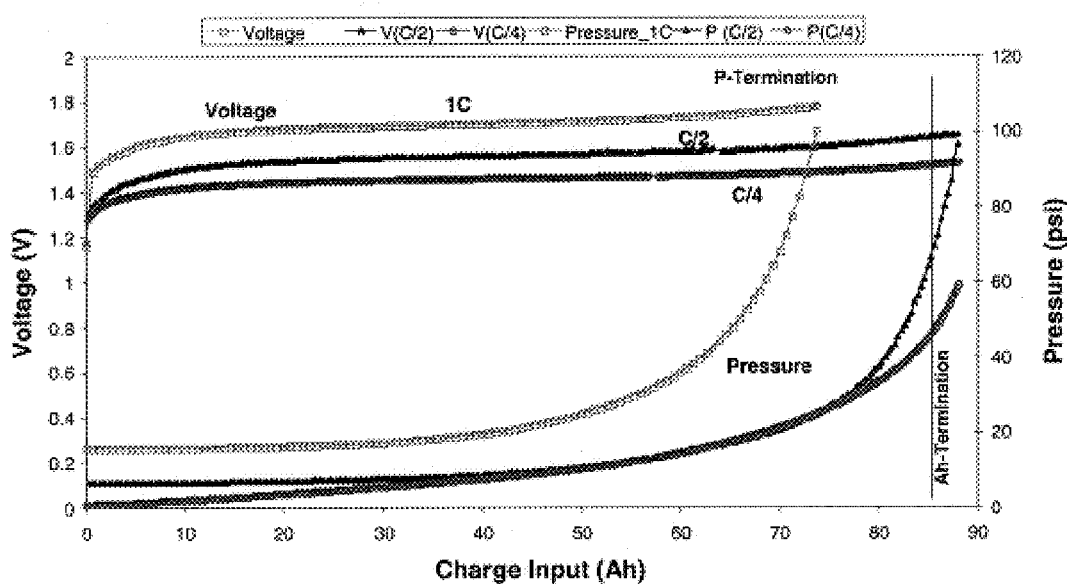
FIG. 1 is a diagram depicts the voltage and pressure profiles during the charging process versus charge input as a function of charge rate. As the charge rate increases the voltage and pressure profiles also increase in an accelerated fashion. The pressure however is much more sensitive to be measured.

DESCRIPTION OF THE PREFERRED EMBODIMENTS (BEST MODES FOR CARRYING OUT THE INVENTION)

The pressure-based control for battery charging of the invention is particularly useful when the major side reactions in the battery involve gas evolution and possibly recombination. This is important for lead acid batteries (particularly the valve-regulated lead-acid battery, or "VRLA"), nickel-cadmium (Ni—Cd) systems, nickel metal hydride (Ni—MH) systems, metal-air (Zinc-air or Al-air) batteries, zinc-bromide systems, and other aqueous battery systems. Even lithium ion or similar alkali-based battery systems where (thermal or electrochemical) electrolyte decomposition could cause gas generation and pressure build-up, the pressure-based control can provide safe operation during charging.

The pressure-based charging control can be accomplished by attaching a pneumatic pressure sensing probe in the headspace of a battery module or a cluster of modules that share a common headspace. The pressure reading is fed to the charger control. When a pressure-based protocol is met, the charge process will be terminated. The pressure-based protocol can be as simple as a pressure lid or as complicated as a dependence on its change with various combinations of time, operating temperature range, the ambient pressure in the operating environment, voltage range and/or its change, current level and/or its change, charge inputs and/or outputs, and other possible pertinent parameters (such as age, state of charge, or state of health, etc.) that are also monitored or determined in the charging process or control algorithm.

Pressure build-up and detection in a battery is very sensitive, far more than the temperature and voltage signals that can be detected using a typical voltage-based transducer. Gas transport in a confined space is very rapid, much faster than temperature detection based on thermal transfer. Therefore, detection of pressure change is quite spontaneous, much more responsive than the temperature measurement. Gas detection can be conducted over a large area or space, if the battery cell compartments share a common headspace and yet still maintain high sensitivity. On the contrary, both the temperature and voltage detections have to be conducted on a localized fashion, such as cell by cell or in small clusters, in order to establish the necessary sensitivity to detect any anomaly in operation. Therefore, the pressure detection can be simplified logistically to take the advantage of simple hardware design to maintain cost-effectiveness while the sensitivity will not be compromised. Thus the pressure-based control approach can be very cost-effective.

Another advantage of the pressure-based control can be illustrated in the high-power, high-rate charging techniques, where the pressure build-up and change from the high charge rate often is so eminent that conventional temperature or voltage-based control strategies are incapable of handling the charge termination properly to prevent adverse effects on battery performance. The pressure-based control strategy, on the other hand, is very effective in dealing with this situation. One important aspect is that the pressure build-up and its change often represent a measure of the side reaction rate. If the side reaction is taking place at a noticeable rate, the charge efficiency will be reduced and the accompanying adverse effects on the battery performance will thus increase [Yang, X. G. and B. Y. Liaw, "Charge Performance of a Commercial Nickel Metal Hydride Traction Battery System," *J Electrochem. Soc.*, 148, A1023–1028 (2001)], which in a short term can degrade the battery power and capacity performance, while in the long run can reduce battery life. Another important aspect is that the pressure detection is so much more sensitive than the other conventional methods that the side reaction can be minimized with proper termination before the adverse effects impact the battery performance, therefore the battery can perform more reliably and efficiently.

Industrial Applicability:

The invention is further illustrated by the following non-limiting examples.

Fast charge remains a real challenge for the nickel-metal hydride (Ni—MH) traction batteries. Most Ni—MH batteries are not recommended for fast charge [J. C. Kopera, "Fast Charging—Strategy for Success," 1999] due to the concern that significant heat ($I^2$ R) will be generated from the inherently relatively high impedance of the system. Therefore, liquid cooling of the battery modules is one of the enabling technologies for fast charging of Ni—MH batteries to date. But, so far limited work has been reported on fast charge of Ni—MH batteries or modules, especially for the electric vehicle applications. Knowledge of the fast-charge control of the Ni—MH batteries (especially, the traction batteries) and their operating limits and underlying mechanisms are therefore very crucial for proper utilization and operation of such devices.

The following examples show that rapid charging of a commercial Ni—MH battery can be achieved by the pressure-based control effectively. The test modules were obtained from GM-Ovonic Battery Company. The modules were made of 11 individual cells, giving a nominal voltage of 12 V. The nominal capacity of the test module is rated at $C_3$=85 Ah and $C_1$=80 Ah. The individual cell was contained and sealed in a stainless steel casing with a gas release valve that can be easily tapped in with a pressure gauge, which is essential for the control of the charge process.

EXAMPLE 1

The charge test protocols include constant current (CC) and constant power (CP) charging regimes. The CC charge rate ranges from 1C to 3C, which corresponds to 85 A to 255 A. In the CP charge regimes, the applied power levels were 1.49 kW, 2.5 kW, and 5.3 kW, which roughly correspond to the average power used in the 1C, 1.6C and 3C charge tests, respectively. We also conducted normal cycle tests at slower charge and discharge rates for comparison. The range of the current level and the power level were constrained by the test equipment capability, not by any theoretical basis or practicality.

FIG. 1 explains the reason why the pressure control is so important in the control of the high rate recharges. The voltage and pressure profiles shown in FIG. 1 depict the pressure change of the module under different charge rates as a function of the charge input. In the conventional low-rate charge regimes, such as those with rates lower than C/2, the charge process was typically terminated by voltage, temperature change, or even charge input (AhIn) cut-off. Under these circumstances, the pressure buildup in the cell is usually below the pressure lid of the vent, thus not critical for termination control. As the charge rate goes up, the gas evolution rate increases as well, resulting in a substantial pressure buildup in the cell. The pressure buildup becomes critical when the charge rate is over C/2. To avoid overcharging and venting, the pressure control in the regimes over C/2 thus becomes a predominant consideration.

EXAMPLE 2

Figure 2:
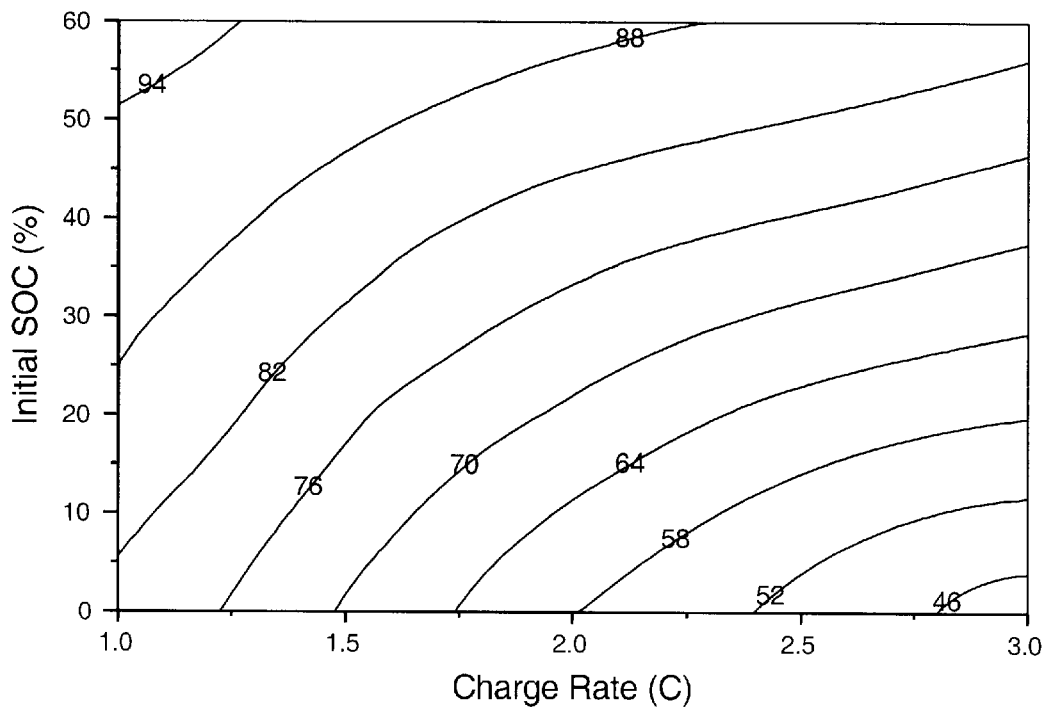
FIG. 2 is a diagram depicts the change of state of charge (SOC) as a result of charging at different charge rate and initial SOC conditions. The number on each specific contour represents the resulting final SOC as a function of initial SOC and the charge rate.

A set of tests were conducted using constant-current charging at 1C, 1.6C, 2C, 2.3C, 2.7C and 3C rates to investigate the dependence of charge characteristics from different initial state of charge, i.e., 0%, 20%, 40% and 60%. In these tests, we extended the pressure lid to 10 atm. For a set of the same initial SOC tests, the capacity increases logarithmically with the recharging time at different rates and as terminated by the same pressure lid. For instance, in the case of starting from an initial 40% SOC, the terminal SOC at the 3C rate is 72%; 92% SOC at 1C, etc.; according to the following equation:

$$SOC(\text{Terminal @ 40\% init; 10 atm; 25C}) = 12.5\, \ln(t_{charge-max@nC}, \text{min}) + 48.7\, (\%\, SOC).$$

where $t_{charge-max@nC}$ depicts the maximum charge duration for the specific nC (n=1 to 3) charge rate at 25° C. and terminated by the pressure lid of 10 atm. The results are summarized in FIG. 2, where the terminal SOC contours are plotted against the initial SOC and the charge rate. This figure shows the map of how to estimate the capacity in the fast charge regimes if the initial SOC and charge rate are known and with the pressure lid control.

EXAMPLE 3

Figure 3:
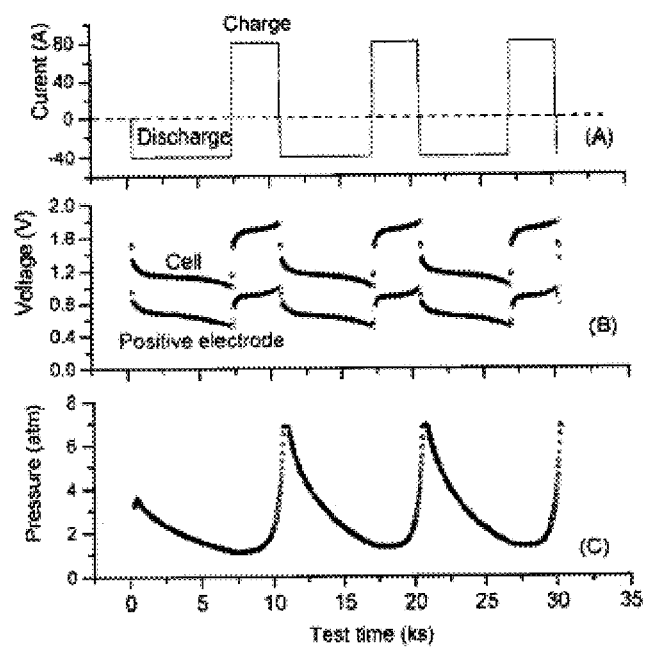
FIG. 3 is two diagrams that depict the comparison of the same battery module that was subjected to different charging regimes. (A) illustrates a reproducible pattern of charging and discharging behavior when the module was charged with pressure-based control protocol. (B) illustrates a progressively deteriorating performance of the battery when using charge input control.
Figure 3:
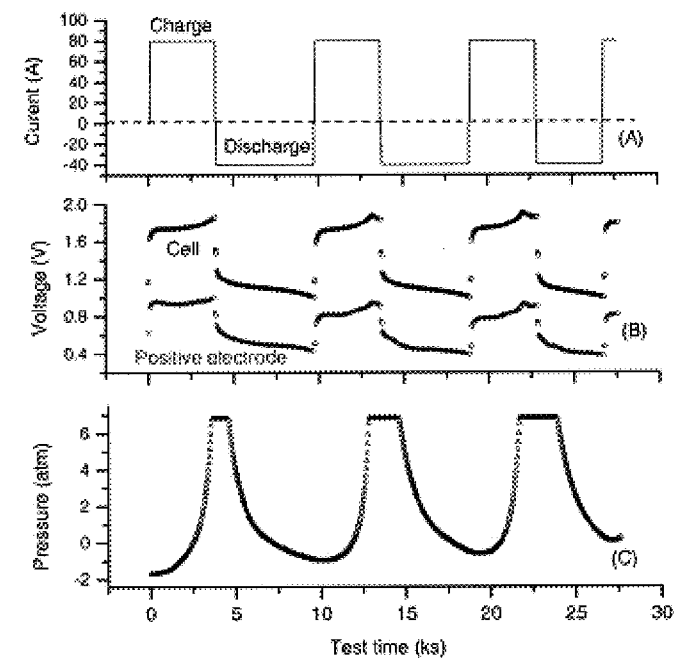

FIG. 3A shows an 80 A charge regime followed by a 40 A discharge cycle. A pressure control strategy was used in the study of the charge performance. When the battery module was charged at 80 A (1C) with a lid pressure set at 6.8 atm, a total charge input of 73.6 Ah with a terminal cell voltage of 1.78 V and a capacity of 72 Ah were achieved. The results show that the 85 Ah Ni—MH module can be reproducibly charged to 85% SOC from a fully discharged state within 55 minutes at 80 A (1C) with a high charge efficiency of 98%. The evidence shown in this experiment indicates that the pressure control is critical to the reversible charge performance of the Ni—MH module.

To validate the importance of the pressure control, another experiment was conducted. By removing the pressure lid of the charge control, the test module was charged at 80 A to a charge input of 86 Ah and measured its performance over three cycles. FIG. 3B shows the results. As the 80 A charge and 40 A discharge cycles continued, it was found that:

The capacity of the three consecutive cycles dropped from 64 Ah, 58 Ah, to 43 Ah, as shown in Table 1. The charge efficiency decreased from 74%, 67% to 50%, accordingly.

TABLE 1

|  | First cycle | Second cycle | Third cycle |
| --- | --- | --- | --- |
| Charge input, Ah | 86 | 86 | 86 |
| Capacity, Ah | 64 | 58 | 43 |
| Charge efficiency, % | 74 | 67 | 50 |
| $-\Delta V$ occurrence | No | Yes | Yes |
| Terminal voltage, V | 1.866 | 1.877 | 1.899 |

EXAMPLE 4

Figure 4:
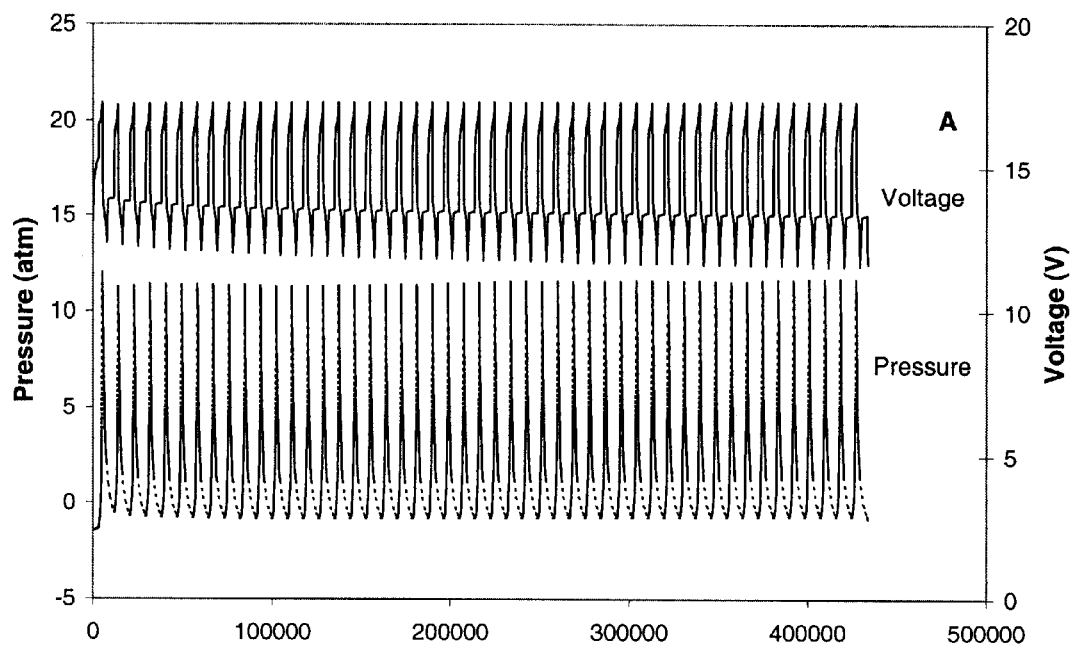
FIG. 4 has two diagrams illustrate that with pressure-based charge control, the battery module can be repeatedly charged and discharged in deep cycles reproducibly over hundreds of cycles. (A) depicts the voltage and pressure profiles. (B) depicts the charge inputs and outputs and temperature excursions at different locations of the cell. The result showing herein represents the conditions when the module was cycled about 250 cycles without any sign of deterioration.
Figure 4:
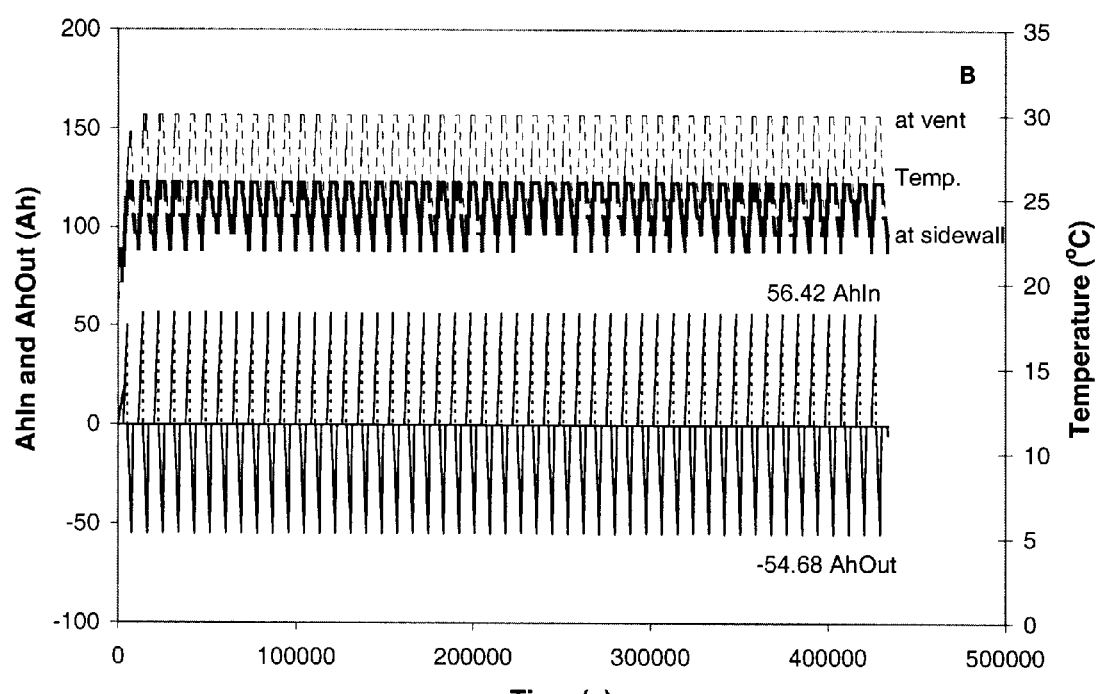

FIG. 4 shows a reliable cycle test of the Ni—MH battery using a pressure-controlled algorithm.

Based on the pressure control algorithm, it was found that the high rate charging can be achieved, reproducibly over hundreds of cycles. FIG. 4 illustrates the cycle life test, where the Ni—MH module was charged at 1C rate. FIG. 4(A) shows the pressure and the voltage profiles during the cycles, demonstrating reproducible behaviors. FIG. 4(B) depicts that the charge was put in and out of the module consistently, while the temperature of the cell changed within a narrow range. The results shown here are those corresponding to conditions of more than 250 cycles without any signs of degradation.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of battery charging control, the method comprising the steps of:
   providing a pressure probe,
   measuring pressure change inside a battery via the pressure probe,
   characterizing pressure profile and its change,
   employing the characterization as a primary protocol to control battery charging processes.

2. The method of claim 1 wherein the measuring step comprises measuring internal battery gas pressure.

3. The method of claim 1 additionally comprising the step of employing as a secondary protocol to control battery charging processes one or more of the parameters from the group consisting of time, operating temperature range, ambient pressure in an operating environment, voltage range, change of voltage range, current level, change of current level, charge inputs, charge outputs, age of battery, and state of charge or battery.

4. The method of claim 1 wherein in the measuring step the battery has a battery chemistry that has one or more side reactions that generate gas species.

5. The method of claim 4 wherein the employing step minimizes side reactions that generate gas species.

6. The method of claim 1 wherein in the measuring step the battery comprises aqueous electrolytes and/or organic electrolytes that have reactions selected from the group consisting of gas reactions and gas generating side reactions.

7. The method of claim 6 wherein the employing step minimizes side reactions that generate gas species.

8. The method of claim 1 wherein in the measuring step the battery comprises nickel-based chemistries.

9. The method of claim 8 wherein the employing step results in a charging rate higher than 3C rate without causing battery degradation from high rate charging.

10. The method of claim 8 wherein in the measuring step the battery comprises a nickel-based aqueous battery chemistry.

11. The method of claim 10 wherein in the measuring step the battery comprises a nickel-based aqueous battery chemistry selected from the group consisting of Ni—Cd and Ni—MH.

12. The method of claim 1 wherein in the employing step a higher pressure excursion results in better sensitivity of control.

13. The method of claim 1 wherein in the employing step the battery is substantially protected from degradation caused by gas generating reactions.

14. The method of claim 1 wherein in the employing step pressure limits are based on mechanical integrity of the battery's containment.

15. The method of claim 1 wherein in the employing step the primary protocol minimizes one or more battery characteristics selected from the group consisting of thermal excursions and temperature changes.

16. The method of claim 1 wherein in the measuring step the pressure probe accesses a headspace of the battery.

17. The method of claim 1 wherein in the employing step termination conditions for the battery charging process are controlled.

18. The method of claim 1 wherein the employing step employs one or more means selected from the group consisting of physical control devices, computer software, and signaling means.

* * * * *